May 13, 1952 A. PENTECOST ET AL 2,596,721
RECORD CONTROLLED EMBOSSING MACHINE
Filed March 7, 1946 9 Sheets-Sheet 3
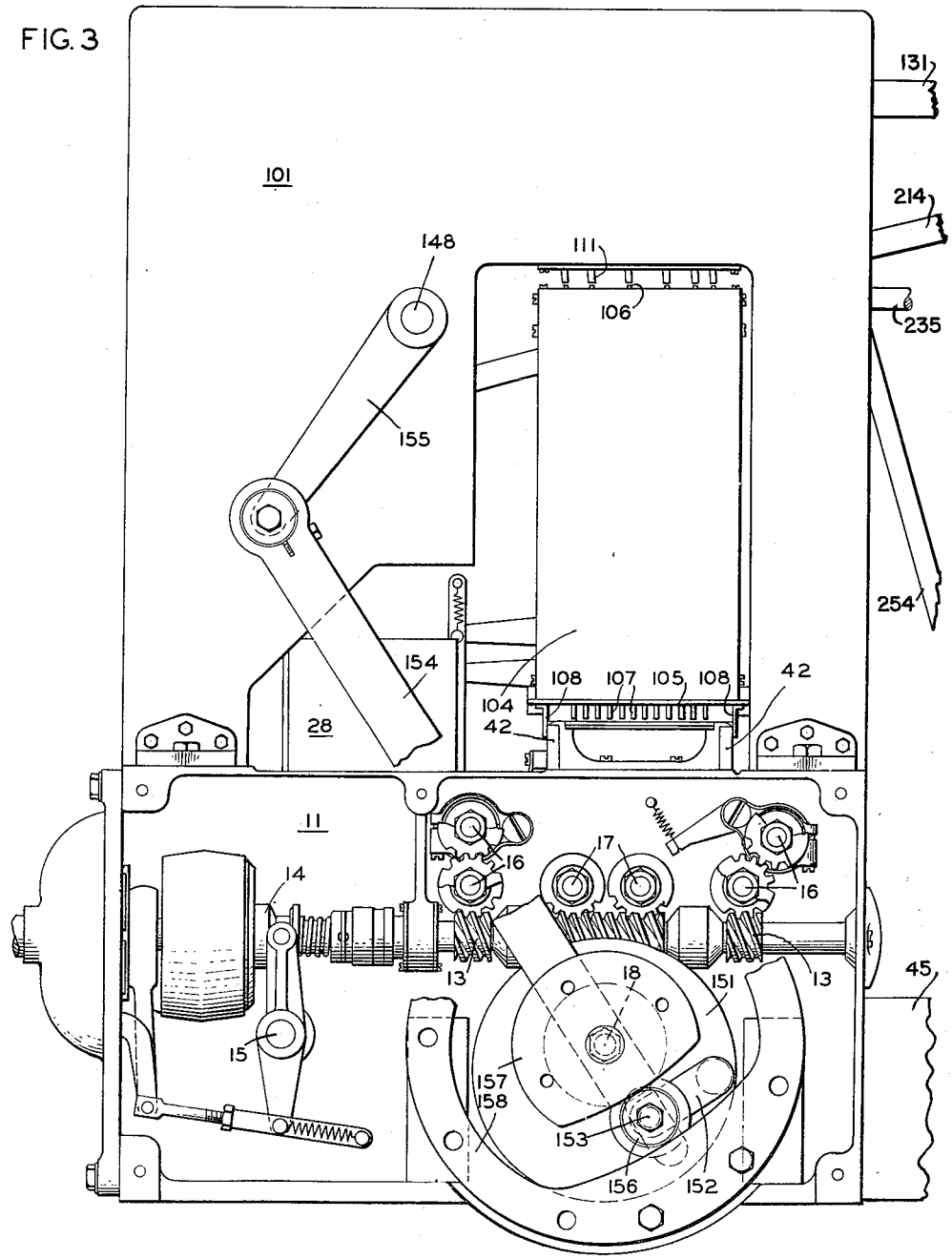
INVENTORS
ARTHUR PENTECOST AND
ALBERT E. SCHNIERTSHAUER
BY
ATTORNEY

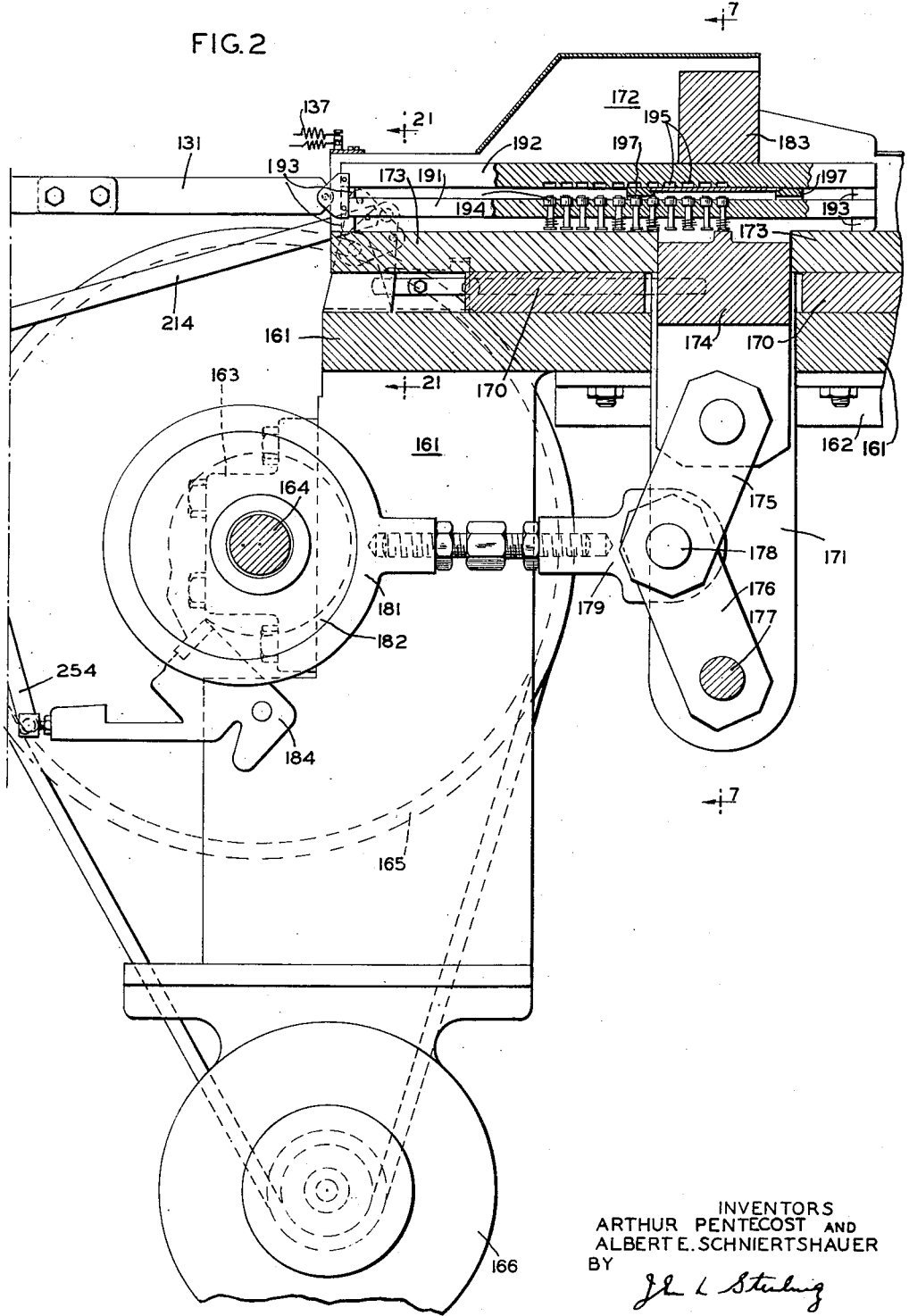

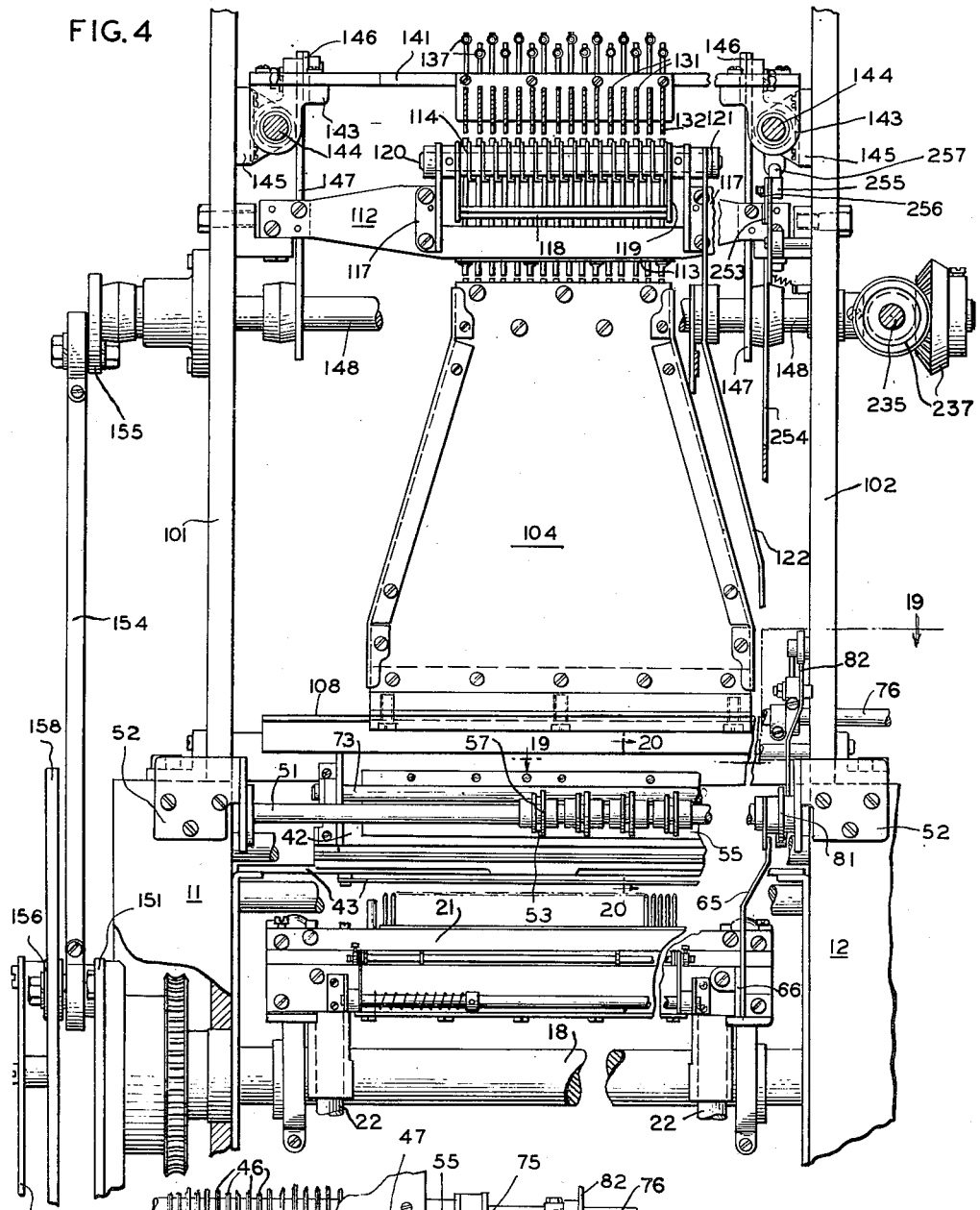

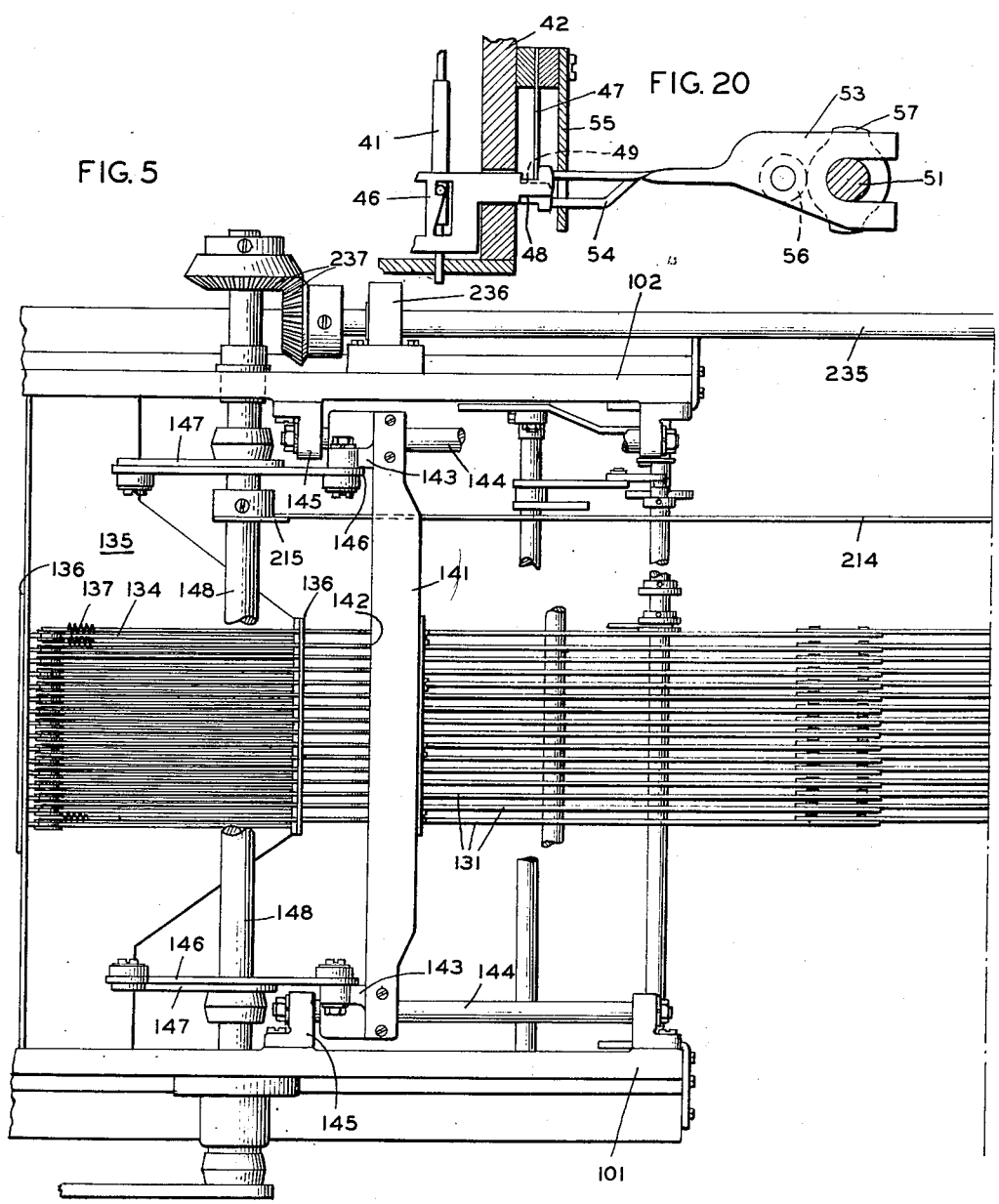

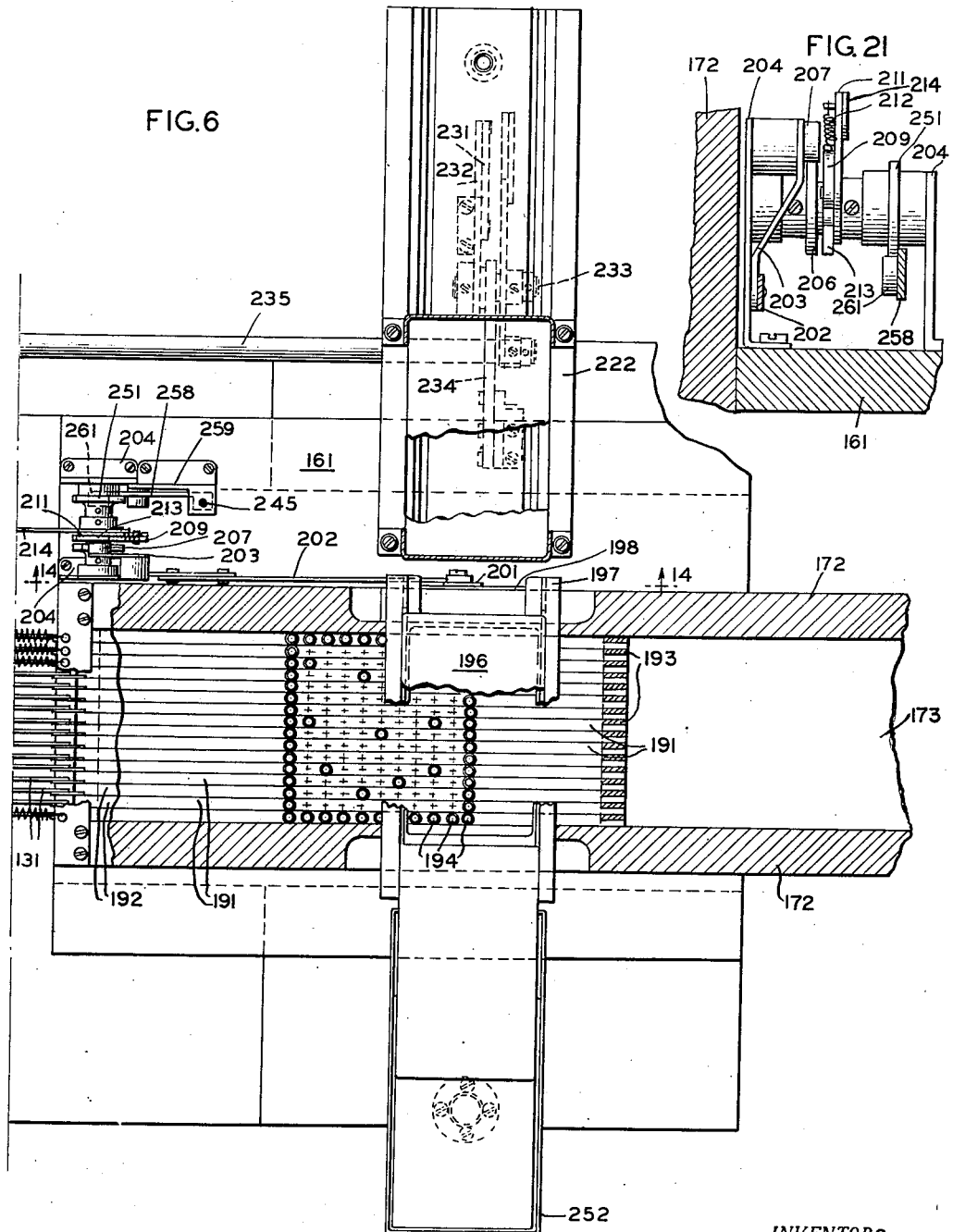

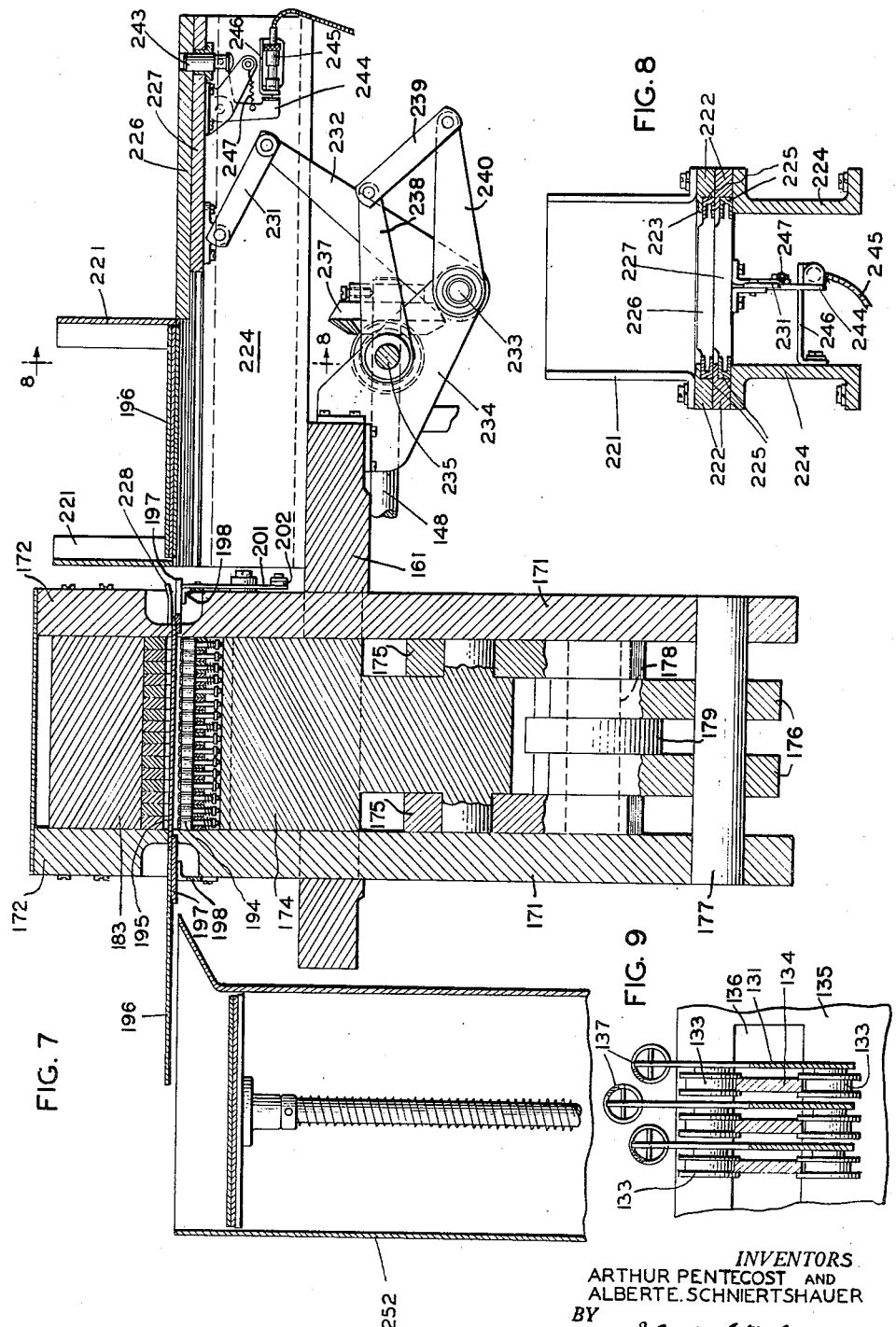

May 13, 1952  A. PENTECOST ET AL  2,596,721
RECORD CONTROLLED EMBOSSING MACHINE
Filed March 7, 1946  9 Sheets-Sheet 8
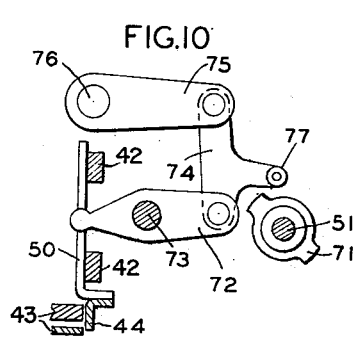
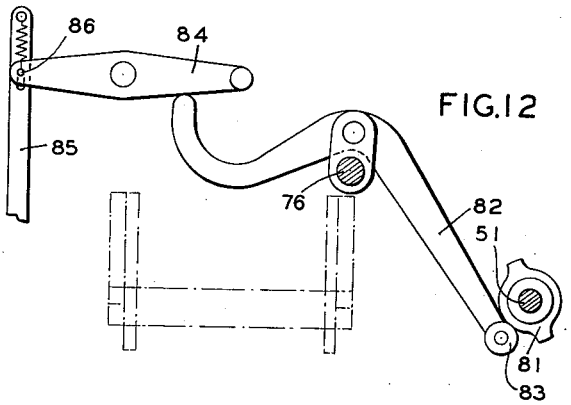
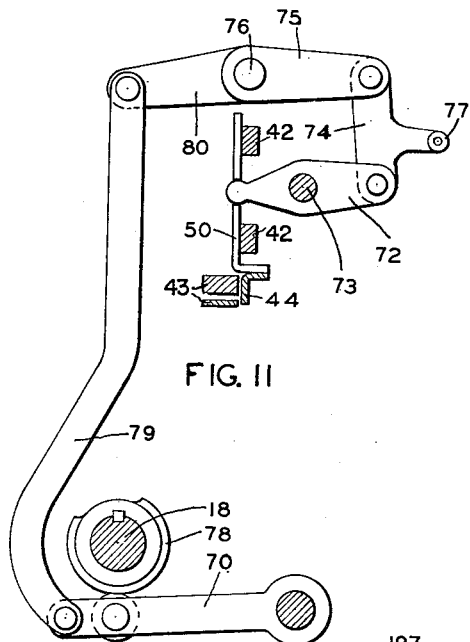
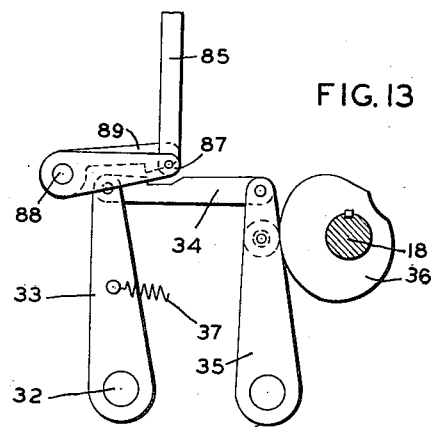
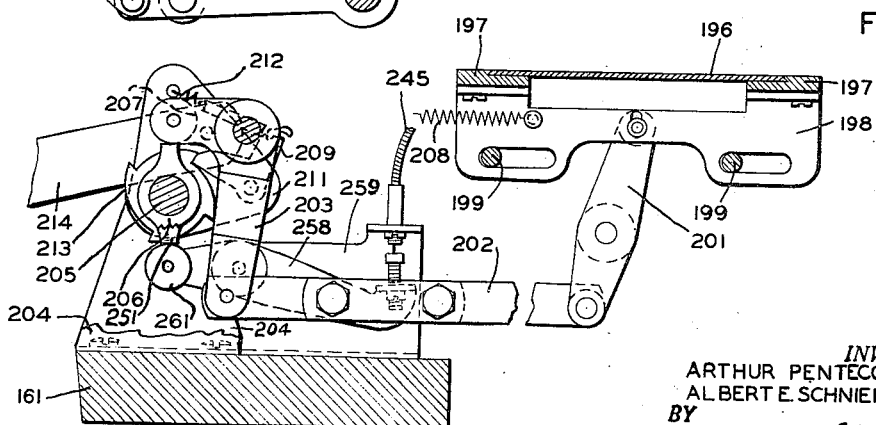
INVENTORS
ARTHUR PENTECOST AND
ALBERT E. SCHNIERTSHAUER
BY
*J. L. Sterling*
ATTORNEY May 13, 1952 A. PENTECOST ET AL 2,596,721
RECORD CONTROLLED EMBOSSING MACHINE
Filed March 7, 1946 9 Sheets-Sheet 9
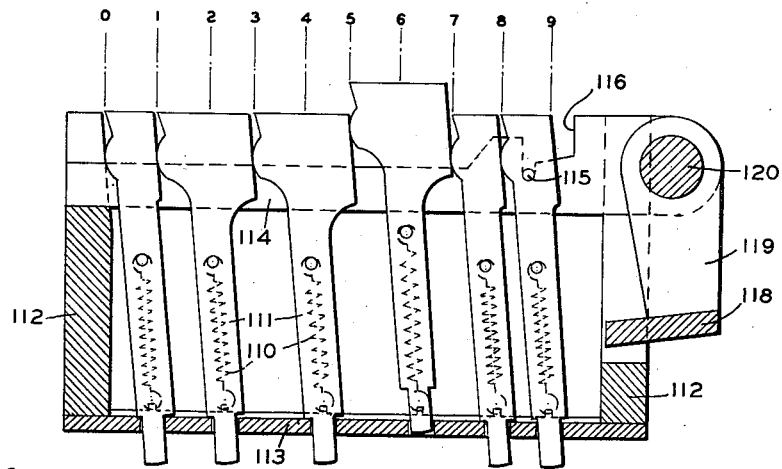
FIG. 15
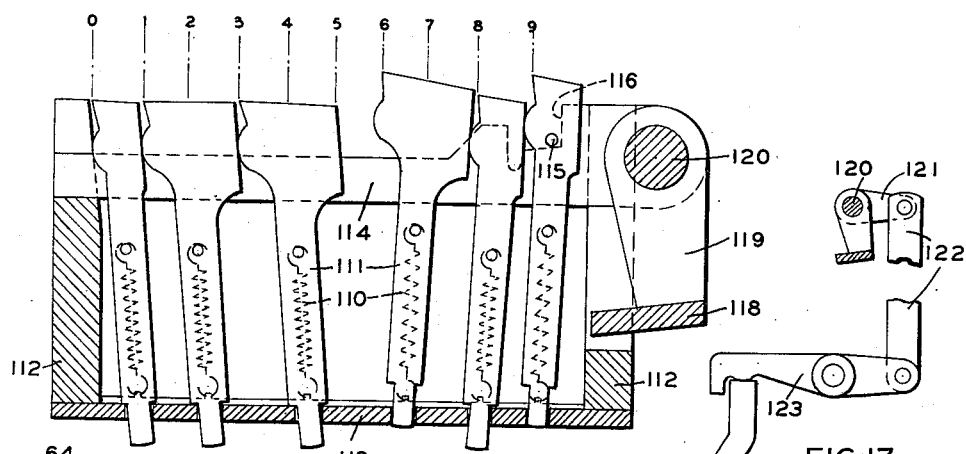
FIG. 16
FIG. 17
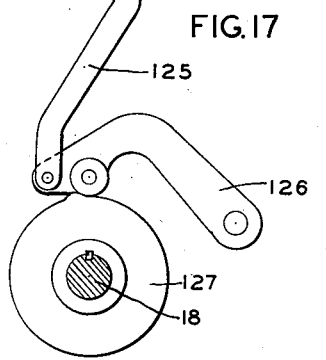
FIG. 18
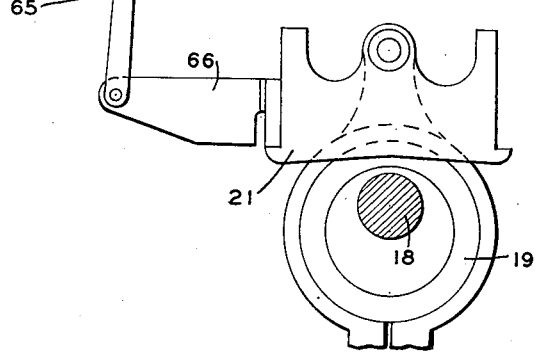
INVENTORS
ARTHUR PENTECOST AND
ALBERT E. SCHNIERTSHAUER
BY
ATTORNEY Patented May 13, 1952

2,596,721

UNITED STATES PATENT OFFICE 2,596,721

RECORD CONTROLLED EMBOSSING MACHINE

Arthur Pentecost, Upper Montclair, N. J., and Albert E. Schniertshauer, New York, N. Y., assignors to Remington Rand Inc., Buffalo, N. Y., a corporation of Delaware Application March 7, 1946, Serial No. 652,740

19 Claims. (Cl. 101—18)

This invention relates to embossing or stamping machines, and more particularly to mechanism whereby such machines may be automatically set up and operated under control of a statistical record card.

One object of the invention is to enable the automatic reproduction, in a permanent stamped or embossed form, of data contained in a record card.

An additional object of the invention is to enable a succession of separate automatic embossing operations of data contained in separate fields of the same record card.

A further object of the invention is to enable the data contained in separate fields of a card to be stamped in a corresponding separate spaced position on the article embossed under control of said record card.

The embodiment of the invention herein disclosed is particularly adapted for transcribing designative data contained in a record card into a more permanent record, such as a registration plate or the like commonly affixed to articles of manufacture for purposes of lasting identification thereof. Heretofore, the transcription of such designative data into an embossed form required the services of an operator for first reading the data from the card, and then manually setting up the dies and operating an embossing machine in accordance therewith.

According to the present invention, the record cards, each containing the designative data to be embossed on an individual registration plate, are fed to the card sensing mechanism of the machine concurrently with the feeding of blank plates between the dies of the stamping mechanism of the machine, the dies being settable in accordance with the data sensed in the corresponding card. In this manner the embossed plates are produced in a continuous and fully automatic operation of the machine at a greatly increased production speed and with the possibilities of human error avoided.

A more complete description disclosing additional objects and features of the invention is contained in the following specification with reference to the drawings, wherein:

Figs. 1 and 2 together are a sectional view of the machine from the right hand side;

Fig. 3 is a right hand side view of that portion of the machine shown in section in Fig. 1;

Fig. 4 is a rear view of that portion of the machine shown in Fig. 1;

Figure 1:
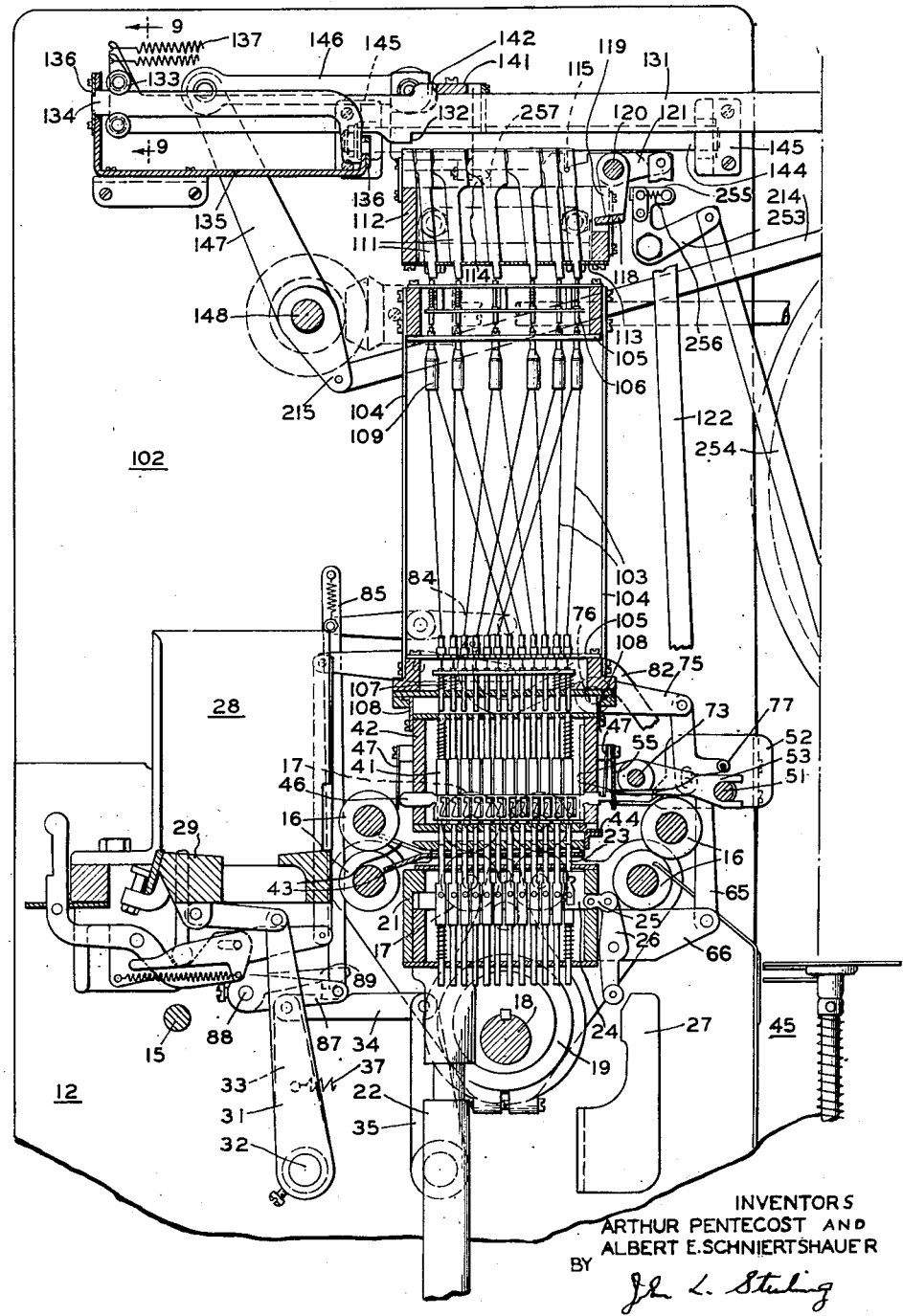

Figs. 5 and 6 together are a plan view of the machine, Fig. 6 being partly in section;

Fig. 7 is a rear sectional view taken along lines 7—7 of Fig. 2;

Fig. 8 is a section taken along lines 8—8 of Fig. 7;

Fig. 9 is a section taken along lines 9—9 of Fig. 1;

Figs. 10 and 11 are fragmentary views of the card stop control mechanism;

Figs. 12 and 13 are fragmentary views of the card feed control mechanism;

Fig. 14 is a section taken along lines 14—14 of Fig. 6;

Figs. 15 and 16 are enlarged detail sectional views of the stop basket;

Fig. 17 is a fragmentary view of the stop basket restoring bail mechanism;

Fig. 18 is a fragmentary view showing the ratchet drive for a certain cam shaft;

Fig. 19 is a sectional plan view taken along lines 19—19 of Fig. 4;

Fig. 20 is a sectional view taken along lines 20—20 of Fig. 4; and

Fig. 21 is a sectional view taken along lines 21—21 of Fig. 2.

The machine embodying the present invention, as seen in the drawings and as hereinafter more specifically described, comprises a structure containing elements of a well known type of embossing machine and a structure containing elements of a well known type of card controlled tabulating machine, said separate structures being mounted adjacent each other on a common platform and provided with improvements and novel interconnecting mechanism enabling their joint operation whereby the objects of the invention are effected. As seen in Figs. 1, 3 and 4 record card feeding and sensing mechanism is contained within a base framework, comprising a right hand box-like frame 11 and a left hand box-like frame 12, the entire base structure, except for the improvements hereinafter described, being similar to that more fully shown and described in patent to W. W. Lasker, 2,044,119, dated June 18, 1936. As therein described, a worm shaft 13 (Fig. 3) journaled in the frame member 11 is belt driven by a motor (not shown) through a clutch 14 actuated by a rock shaft 15. Card feed rolls 16 and skid rolls 17 extending between and journaled in the frames 11 and 12 are driven by worms on the shaft 13, as is also the main base shaft 18 which carries the usual eccentric 19 (Fig. 1) for reciprocating the sensing pin box frame 21 on its guides 22. The sensing pin box frame supports the usual individually yieldable sensing pins 23 and locking slides 24, which slides are shifted laterally to a locking position relative to the pins during each reciprocation of the pin box through a bail 25 supported in rock arms 26 actuated by a fixed cam 27 in the usual manner.

Record cards loaded in the card magazine 28 are fed to the front feed rolls 16 by the usual card picker 29 reciprocated by arm 31 fast on rock shaft 32, which rock shaft, also seen in Fig. 13, carries an additional arm 33 actuated against the tension of a spring 37 by means of a link 34 connecting said arm with a follower arm 35 adapted to bear on cam 36 mounted on the main base shaft 18. In operation, as fully described in the aforesaid patent, each reciprocation of the picker 29 feeds the bottom card from the magazine to the front feed rolls 16, which rolls continue to advance the card, in cooperation with skid rolls 17, between a pair of suitably spaced perforated plates 43 comprising a card sensing chamber, the card being retained in the chamber by a card stop 44 lowered, in a manner hereinafter described, to block the passage of the card through the chamber. The card, while arrested by the card stop 44, is sensed by the reciprocating sensing pins 23, upon completion of which the raising of the card stop releases the card for continued advance by the skid rolls to the rear feed rolls 16 which propel the card into the usual eject pocket 45. On each sensing stroke of sensing pin box frame 21, all sensing pins 23 which find perforations in a card become locked by slides 24, integral with the frame to raise a corresponding one of a plurality of set pins 41 yieldably supported in the usual set pin box frame 42. In this manner the perforation pattern of a card is registered among the set pins by the upward displacement thereof, spring pressed locking slides 46 adjacent to each row of set pins serving to lock each displaced pin 41 in its raised position, so as to retain the pattern for control purposes throughout the ensuing cycle of the machine.

As hereinbefore stated, the present embodiment of the invention is intended to enable the automatic embossing of a blank plate, such as a registration plate or the like, in accordance with identifying data contained in a standard statistical card, which data may comprise only a portion of the total amount of data recorded on said card, and which data it is desired to emboss on separate spaced positions of the registration plate. In order to achieve this result, certain improvements have been added to the structure disclosed in said patent to Lasker by which the sensing of a card is repeated and the registration of the card pattern split so as to control successive machine operations only in accordance with data contained in different selected fields or group of fields of card columns. The means for achieving a split pattern registration includes a cam shaft 51 disposed to the rear of the set pin box frame 42 and journaled in brackets 52 secured to each of the boxlike frames 11 and 12. Loosely carried by the shaft is a series of slide retract paddles 53 and 54, each of which, as best seen in Figs. 19 and 20, has one end formed as a yoke encompassing the shaft 51, and has its other end twisted to provide a flat surface abutting the ends of a plurality of the set pin locking slides 46. The flat twisted ends of said paddles are supported in positions adjacent to the slides by a comb plate 55 secured to the set pin box frame 42, and having slots conforming to the shape and position of the paddles supported therein. The paddles 53 and 54 are of identical construction except that, as best seen in Fig. 20, the slide actuating end of paddles 54 is bent to abut the slides in a position below that of paddles 53, in order that one paddle may be enabled to retract a plurality of slides corresponding to one field of adjacent columns of a card without concurrent retraction of slides corresponding to another field of columns of the card. The necessity for such provision arises from the modifications required in adapting the set pin box of said patent for use with the well known Powers 90 column card, as more fully shown and described in subsequent patent to W. W. Lasker 2,151,406, dated March 21, 1939, whereby a pair of locking slides 46 is provided for each row of set pins, i. e., one slide for locking the six pins of a row corresponding to a lower zone card column, and another slide for locking the remaining six pins in the row corresponding to an upper zone card column. Accordingly, it will be understood that of each pair of slides disposed between adjacent rows of set pins 41, one of said pair is an upper zone slide and the other a lower zone slide. As best seen in Fig. 20, the end of each slide 46, extending through and beyond the rear of the frame 42, is formed with notches cut out therefrom, the notches 48 on all upper zone slides being in the under edge of the slide, and notches 49 on all lower zone slides being in the upper edge of the slide. For this reason, it will be seen that the lateral movement of a paddle 53 will engage and retract a plurality of consecutive upper zone slides passing above all intermediate lower zone slides, and, likewise, all paddles 54 will engage and retract only a consecutive group of lower zone slides, in passing below all intermediate upper zone slides. Each of said slides is yieldably retained in normal locking position by the usual individual leaf springs 47, which, in the present instance, are mounted in rows on both the front and rear surfaces of the frame 42 (Fig. 1), the row mounted on the front surface bearing on only lower zone slides, the other rear row of springs bearing on the upper zone slides.

As also seen in Fig. 19, each of the paddles 53 and 54 is provided with a follower roller 56 bearing on the surface of individual retract cams 57 mounted on the shaft 51. A separate cam is normally provided to actuate each paddle except, however, in instances where the desired width of a paddle requires that it be formed with a double yoke, in which instances a separate cam is provided for each yoke. The cams are shaped with two diametrically opposed high surfaces and act through the paddles to retract and release the related slides once in each half revolution of the shaft 51. The cam shaft is rotated 90° or a quarter turn within each machine cycle by ratchet drive which, as best seen in Fig. 18, includes a ratchet wheel 61 fast on the shaft, said wheel being provided with four equidistant teeth. A rocker plate 62, loosely mounted on the shaft adjacent to the wheel, carries a pivoted pawl 63 yieldably bearing on the wheel under tension of a spring 64. A link 65 is also pivoted to the rocker plate, the lower end of which link is pivoted to an arm 66 secured to the sensing pin box frame 21. It will be seen that on each upward sensing stroke of the sensing pin box which occurs each machine cycle, the rocker plate 62 will be rocked counter-clockwise as viewed in Fig. 18, to result, through the pawl 63, in rotating the wheel 61 and shaft 51 a quarter turn. Accordingly, it will be seen that each locking slide 46 under control of a cam 57 (Figs. 19 and 20) is held retracted every other or alternate cycle of the machine, the timing being such that cams of one set are in an effective position during those cycles in which the cams of another set are in an ineffective position.

The shaft 51 also carries a cam 71 for controlling the operation of the card stop 44 which, as best seen in Fig. 10, is of the usual construction, supported by a pair of upright guide arms 50 (one shown) each engageable by an individual rock arm 72 mounted on a rock shaft 73. One of the arms 72 extends rearwardly beyond its axis and is pivoted to a link 74 connecting the extended arm with a rock arm 75 mounted on a shaft 76. As seen in Fig. 11, a card stop cam 78 is mounted on the main base shaft 18, which cam operates through a follower arm 79, link 79 and rock arm 80 to retain the shaft 76 in its most counter-clockwise rocked position (Figs. 10 and 11), permitting clockwise return, by spring pressure, of the shaft at the proper time in the cycle to raise the card stop and enable ejection of a card from the card chamber. In the present instance the link 74 is formed with a rearwardly extending arm mounting a follower roller 77 bearing on the cam 71. It will be seen that on alternate machine cycles, the card stop will be held in its lower effective position under control of the cam 71, retaining a card in the card chamber for a second sensing thereof.

The card feed is disabled on alternate machine cycles by action of a similarly shaped cam 81 also mounted on the shaft 51. As seen in Fig. 12 a hook shaped lever 82, supported near its midpoint by a floating pivot mounted on the shaft 76, carries at one end a roller 83 bearing on the cam 81, the other end of which bears on the under side of lever 84 pivotally mounted on the machine frame. A link 85, having a slot near one end thereof to encompass a pin 86 on the lever 84, is pivoted at its lower end to a rock arm 87 (Fig. 13) fast on a rock shaft 88 journaled in the frame 12. Also fast on shaft 88 is a latch arm 89 adapted to engage a cut-out in the aforementioned link 34. As above described, the link 34 would normally reciprocate once each cycle through the action of the cam 36 and spring 37 to reciprocate the card picker 29 (Fig. 1). However, as seen in Figs. 12 and 13, the rotation on alternate cycles of a high dwell of cam 81 against the roller 83 results in rocking the shaft 88 clockwise to engage the latch arm 89 with the link 34 and thus prevent reciprocation of the card picker. The yieldable pin and slot connection between link 85 and lever 84 is provided to avoid the necessity for extremely close timing in the action of the cam 81, since it permits the lever 84 to start rocking before the link 34 has returned to its normal starting, i. e., most forward position.

From all the foregoing it will be seen that, through operation of cam 81, every other cycle of the machine acts to feed a card into the card chamber, which card is retained in the card chamber under control of cam 71 for two sensing operations, in each of which sensing operations a different group of set pins 41 is selectively disabled for control purposes by retraction of their associated locking slides 46 under control of one or the other sets of slide retract cams 57.

In the present machine, as distinguished from said prior patents, the card pattern registered and retained in the set pin box is utilized to limit the movement of a series of differentially settable die supporting slides 131, one end of each of which comprises a pair of stamping bars 191, 192 (Fig. 2), as hereinafter more fully described, the other ends of which (Figs. 1 and 4) are supported in the head of the machine between two side frame plates 101 and 102 which are secured to the base box-like frame members 11 and 12, respectively. The movement of the set pins 41 under control of a card is carried to the head section of the machine, in the usual manner, by a plurality of wires 103 supported in a removable structure generally referred to as a translator unit. As can be seen in Figs. 1, 3 and 4, and as well known to the art, the translator unit comprises a box-like frame 104, the upper and lower ends of which support a series of perforated plates 105 in which are mounted an array of upper and lower yieldable pins 106 and 107, respectively, and the ends of the wires 103. The translator frame is supported on a pair of rails 108 secured to the top of the set pin box frame 42, on which rails the unit may be manually slid in and out of position, the frame 101 being cut away for that purpose. Movement imparted to a lower pin 107 is conveyed through a wire, preferably of the well known Bowden type, to raise a corresponding upper pin 106. In the present instance, wires 103 are provided for conveying movement of only those set pins 41 under control of the retract cams 57, the movement of all other set pins being ineffective to raise any of the pins 107. In addition, it will be noted that each upper pin is wired so as to be raised by either one of a pair of lower pins 107 through the well known inverted Y wire connection 109, it being understood that each one of said pair of lower pins is actuated by a set pin under control of slide retract cams 57 effective in different machine cycles. Accordingly, it will be seen that the sensing of a record card operates to actuate pins 107 only in accordance with perforation patterns contained in preselected fields of the card, upon completion of one sensing operation the pins 107 being held actuated to represent the pattern of one group of card columns, upon completion of the second sensing of the same card the pins 107 being held actuated to represent the pattern contained in another group of card columns.

Each of the upper translator pins 106 is adapted to raise a corresponding stop 111 into an engageable position relative to a slide 131, said stops being arranged in rows corresponding to card columns and comprising a stop basket contained within a supporting frame 112 extending between and secured to the side frame plates 101 and 102. The stop basket is similar to that disclosed in patent to W. W. Lasker, 1,780,621, issued November 4, 1930, but of a simplified construction, since zero suppression mechanism is not required in the present instance. As seen in the enlarged detailed Figs. 15 and 16, the lower end of each stop is formed with shoulders by which it is yieldably supported by springs 110 in a perforated base plate 113. The head of each stop is formed as shown so as to bear on the edges of adjacent stops in the same row, the alignment of each row maintained by guide strips 114. Said strips are disposed between each row of stops and are secured at one end thereof to the frame 112 and are loosely mounted at their other end on a rock shaft 120 journaled in brackets 117 (Fig. 4) secured to the frame 112. It is understood that each stop represents an index position of a related card column, in the present instance the left most stop being the "zero" stop, and the right most stop the "nine" stop. The "nine" stop is provided with a stud 115 cooperating with a recess in the strip 114, so that any lateral rocking or spreading of the stops is prevented so long as the "nine" stop remains lowered, in which event the actuation of any one of the other stops results in defining a corresponding setting position for the associated slide 131. However, as seen in Fig. 16, the actuation of a "nine" stop releases that stop for horizontal rocking by the actuating force for the slides 131 to the point where the stud 115 bears on a shoulder 116 of the strip 114, permitting a similar rocking of any one of the other stops which may be raised in combination with the "nine" stop. Accordingly, it will be seen that each stop other than the "nine" stop serves to define either of two adjacent setting positions for the slide 131, depending on whether or not it is raised in combination with the "nine" stop, the arrangement conforming to the use of the well known Powers numeric code in which the "zero" and all odd digits are consecutively represented by single index positions of a card, and all other even digits by multiple index positions comprising the next lowest odd digit index position in combination with the "nine" index position.

The stops are restored to their normal ineffective position by a restoring bail 118 carried by arms 119 fast on the shaft 120 and adapted to rock within a cut away portion of the stop basket frame 112. As seen in Fig. 17, the shaft 120 carries an arm 121 pivotally connected by a link 122 with one end of a lever 123, the other end of which lever rests on a suitable guided upright link 125 carried by a follower arm 126 actuated by a cam 127 on the main base shaft 18. In each machine cycle, the cam acts to momentarily rock and return the restoring bail 118 so as to shift any "nine" stop, which may be held in raised position by its stud 115, to the left, thereby enabling the stud to engage the recess in the strip 114 restoring the "nine" and all other stops in the row to their normal contiguous positions.

As seen in Figs. 1 and 4, the differentially settable slides 131 are formed with a heel 132 for engagement by a raised stop 111, and have one end mounted (see also Fig. 9) by rollers 133 on rails 134 supported by a plate 135 extending between and secured to the side frames 101 and 102. Said plate is formed with vertically bent walls, each wall having a cut out portion enclosed by a comb plate 136 (Figs. 1 and 5) in which the ends of each rail are suitably spaced and supported. The slides are released for horizontal movement under tension of springs 137 each cycle of the machine by means of a bail bar 141 engageable with a nose 142 formed on the upper edge of each slide. Secured to each end of the bail bar are sleeves 143 slidably mounted on guide rods 144 supported by brackets 145 secured to the inner surfaces of each of the side frames 101 and 102. The sleeves are reciprocated on said rods by links 146 pivotally connecting said sleeves with rock arms 147 fast on a rock shaft 148. The shaft 148 is the main operating shaft for the head section of the machine, being journaled in and extending beyond the side frames 101 and 102. It will be seen that a clockwise rocking of the shaft 148, as viewed in Fig. 1, will release the slides to settable positions determined by the stops 111, the counter-clockwise rocking of the shaft acting to restore the slides to the position shown.

The shaft 148 is rocked each machine cycle through a crank disc 151 (Figs. 3 and 4) on the main base shaft 18, the construction and operation of which is similar to the means disclosed and described in patent to J. Mueller, 2,381,361, August 7, 1945, for reciprocating the type carrier restoring bar of the machine of said patent. As therein described, a lever 152 pivoted to the disc 151 is connected by a wrist pin 153 with a pitman 154 pivoted to a rock arm 155 fast on the shaft 148. The wrist pin carries a roller 156 guided for movement in box cam slot formed by a stationary cam 157 and an outer ring 158, both mounted on a supporting frame plate 159 (Fig. 4), mounted on the box-like frame 11 in the same manner as described in said patent to J. Mueller. It will be seen that rotation of the disc 151 acts preliminarily to rock the pitman 154 about its pivot point with arm 155, and that during the major portion of a cycle, wherein the roller 156 is guided within that portion of the slot concentric with the shaft 18, the pitman acts to rock and return arm 155 and shaft 148 to cause the reciprocation of the slide restoring bail 141 through the means above described. In this manner the slide restoring bail is held inactive a sufficient period of the cycle to enable a change of set up in the stops 111 under control of a card as above described.

As can be seen in Fig. 2, the embossing mechanism of the machine is disposed to the rear of the above described card operative mechanism, and includes a frame 161 cast as shown with a horizontally extending shelf-like surface mounted on suitable supports 162, and with a pair of vertically extending legs each mounting a bearing 163 for a drive shaft 164. Mounted on the drive shaft is the usual flywheel 165 chain driven by a motor 166. The embossing mechanism head frame comprises a pair of substantially T-shaped castings, the vertical arms 171 of which extend downward through the shelf of frame 161, the horizontal arms 172 of which are joined by blocks 173, said head being supported in a raised position off the frame 161 by spacing blocks 170. An embossing hammer 174, guided for reciprocable movement between the blocks 173, is actuated from a toggle joint formed by a pair of links 175 pivoted to the hammer, and a pair of links 176 mounted on a shaft 177 extending between the two arms 171. Said pairs of links are jointly pivoted to a pin 178 carrying a knuckle 179 adjustably secured to an eccentric strap 181 cooperating with an eccentric 182 fast on the shaft 164, each revolution of the shaft acting to reciprocate the hammer toward an anvil 183 supported in the frame arms 172. A suitable one revolution clutch, not shown, is provided for driving the shaft 164, which clutch is tripped by the counter-clockwise rocking of a clutch dog 184 pivotally mounted on frame 161 and actuated in a manner hereinafter described.

As best seen in Figs. 2 and 6, slidably mounted in the channel formed by the frame arms 172 and base blocks 173 are the ends of the die supporting slides 131 comprising a pair of stamping bars 191, 192 spaced apart and having runners 193 bearing on the blocks 173, the construction and operation of said bars being similar to that more fully shown and described in patent to W. J. Pannier, Jr., 1,789,831, issued January 20, 1931. Each of the bars 191 is perforated to support a row of individually yieldable male dies 194 which, in the present embodiment, include dies for the ten digits 0-9 from right to left as viewed in Fig. 2, the cooperating female dies 195 being carried by each of the bars 192, it being understood the pitch between the dies is the same as the distance between successive stop positions defined by the stops 111 (Fig. 1). Accordingly, it will be seen that the differential setting of each slide 131 by said stops, under control of a card as hereinbefore described, will result in positioning a corresponding pair of dies between the raised stamping surface of the embossing hammer 174 and the anvil 183.

As seen in Figs. 6, 7 and 14, blank plates 196 are supported between pairs of cooperating dies by an open frame comprising a pair of supporting bars 197 extending transversely to the bars 191, 192 and through openings in frame arms 172. The ends of said bars are secured to slotted brackets 198 slidably mounted on studs 199 formed on said frame arms, the upper surface of said bars having a beveled groove for engaging opposite edges of plates fed therebetween.

In order to enable embossing on separate spaced positions of a blank plate, means are provided for shifting the supporting frame each machine cycle, which means include a lever 201 mounted on the left hand frame 172, one end of the lever pivoted by pin and slot connection to the bracket 198, the other end to a link 202, which link is pivoted to a bell-crank 203. As also seen in Figs. 6 and 21, said bell-crank is mounted on one of a pair of brackets 204 secured to the shelf-like surface of the frame 161, in which bracket is journaled a cam shaft 205 (Fig. 14) carrying a double action cam 206. The follower arm of the bell-crank 203 is provided with a roller 207 bearing on the cam, which results in rocking the bell-crank and shifting the brackets 198 and supporting bars 197 from one embossing position to another in cooperation with a spring 208. The cam 206, having two diametrically opposed high surfaces, is rotated a quarter turn each machine cycle by a pawl 209 carried by a triangular shaped rocker plate 211 loosely mounted on shaft 205, the pawl yieldably bearing by spring 212 on a ratchet wheel 213 having four equidistant teeth and fast on the shaft 205. The rocker plate is rocked counter-clockwise and back each machine cycle by a link 214 (Fig. 5) pivotally connecting the plate with a rock arm 215 fast on the hereinbefore described head shaft 148.

Blank plates 196 are fed to the supporting bars 197 from a magazine which, as seen in Figs. 7 and 8, is formed by a pair of upright retaining walls 221 bent at right angles to encompass the four corners of a stack of plates and mounted over two pairs of bars 222, supported on angle bars 224 which are in turn secured to the shelf of the frame 161. The upper pair of bars 222 is formed with a flange 223 for supporting the edges of a plate 196, each of said bars 222 and 223 being fitted with grooved guide rails 225 for supporting and guiding a pair of reciprocable feed blocks 226 and 227. The upper block 226 passes just below the retaining wall 221 of the magazine to engage the bottom plate of the stack and to advance it through guiding lips 228 onto the supporting frame comprised of the bars 197 above described. Said block 226 is reciprocated through concurrent reciprocation of the lower block 227, which is pivotally joined by a link 231 with a rock arm 232 fast on a stub shaft 233 journaled in a bracket 234 secured to the frame 161. Also journaled in said bracket is one end of a rock shaft 235, the other end of which (Fig. 5) is journaled in a bearing 236 on the frame 102, being driven through bevel gears 237 by the rock shaft 148. A rock arm 238 fast on shaft 235 is pivotally connected by a link 239 to an arm 240 fast on the stub shaft 233 whereby the rocking of shaft 148 each cycle acts to rock the shaft 233 and reciprocate the block 227 each cycle. In order to feed only on alternate cycles, means are provided for connecting or disconnecting block 227 with or from block 226, said means including a headed plunger 243 carried by block 227 and engageable with an aperture in block 226 so that, when the plunger is raised, the two blocks reciprocate in unison, but when lowered, the block 227 reciprocates singly without causing a plate to be fed. The plunger is actuated by a bell-crank 244 pivoted to a bracket secured to the block 227, one arm of which bell-crank engages the head of the plunger, the other arm formed with an ear bent adjacent to the end of a Bowden wire 245 supported in a bracket 246 secured to one of the angle bars 224. The bell-crank is yieldably retained in position shown in Fig. 7, by a spring 247, in which position the plunger is raised or effective, and it will be seen that actuation of the wire will cause the bell-crank to rock about its pivot point to lower the plunger to an ineffective position. The wire is actuated on alternate cycles by a cam 251 (Figs. 6, 14, and 21) which cam is similar in shape and function to cam 206 and is fast on the shaft 205 which, as hereinbefore described, is rotated a quarter turn each cycle. A lever 258 pivoted to a bracket 259 secured to the frame 161 has a follower roller 261 at one end thereof bearing on the cam, the other end of which lever is formed with an ear for engaging the end of the Bowden wire 245 supported in the bracket 259. It will be seen that on alternate cycles, the wire is actuated from the cam to hold the plunger 243 in ineffective position.

It is understood the positions of cams 251 and 206 on the shaft 205 are such as to time the feed of blank plates to occur in those cycles in which the supporting frame is in its most rearward position, as in Fig. 6, and not to occur in the intervening cycles in which the frame is shifted to its most forward position. Plates successively displaced from the frame by the feeding operation drop into the usual eject pocket 252.

The clutch tripping mechanism for engaging the embossing machine shaft 164 with its driving motor 166 includes, as seen in Figs. 1, 2, and 4, a bell-crank 253 mounted on the frame 102, one arm of which is pivoted to a clutch trip link 254 connected with the clutch dog 184 (Fig. 2), the other arm of which carries a trip lever 255 formed with an ear yieldably bearing on the edge of the bell-crank arm by a spring 256. The ear of the lever 255 lies in the path of reciprocation of a finger 257 carried by the left hand restoring bail sleeve 143. It will be seen that, on each stroke of the sleeve, the finger will engage the ear of lever 255 to rock the bell-crank 253 clockwise, pushing on the link 254 and dog 184 to throw the clutch into engagement. On the return or restoring stroke of the sleeve, the finger acts only to rock the lever 255 about its pivot against tension of the spring 256, being ineffective to rock the bell-crank or other linkage connected thereto. It should be understood that the shaft 164 is driven at a considerably faster speed than the shaft 18, a complete stamping cycle being effected within a small fraction of the cycle of shaft 18 and at a time near the midpoint thereof.

In operation it will be seen that on each revolution of the main base shaft 18, the card then in the card chamber is sensed and all set pins 41 corresponding to the pattern of the card are raised. However, of the two selected fields of set pins wired to the stops 111, only one of said selected fields remains raised during the descent of the sensing pin box, the slides 46 for locking the other selected field of set pins being disabled by one set of the slide retract paddles 53 or 54. At a time shortly after the sensing pins have reached their top position, which occurs at about 0° of the cycle, the main head shaft 148 begins to rock, releasing the differentially settable slides 131, shifting the blank plate supporting frame 197 to its most forward position and retracting the plate feed block 227. As the slides are being released, the embossing machine clutch is tripped, the timing being such as to raise the embossing hammer to the top of its stroke after the heel 132 of the slides could have passed the last or "nine" stop 111 and just before it reaches the limit of its stroke which occurs at 180° of the cycle. It is understood that if no stop 111 is raised in any one row, the slide 131 controlled by that row will reciprocate a full stroke carrying all its dies beyond the hammer 174 to prevent any stamping thereby. At midpoint in the cycle the shaft 148 starts rotating counter-clockwise, restoring all slides to normal position as shown, and at the same time advancing the feed block 227. However, since in this first cycle the locking plunger 243 is held in disengaged position by cam 251, no new blank plate is fed. On the second cycle, the stops 111 will be held raised in accordance with the pattern of the other selected field of card columns, the shaft 51 having been rotated a quarter turn to render the one set of paddles 53 or 54 ineffective and the other set of paddles 53 or 54 effective. Concurrent with the release of the slides 131 in this second cycle, the blank plate supporting frame is shifted back to its most rearward position as shown, to cause the embossing to appear on a separate spaced position of the plate 196. On the restoring stroke of the slides 131 in the second half of the second cycle, the advance of the block 227 acts to feed a blank plate to the supporting frame and eject a stamped plate therefrom, the shaft 205 and cam 251 having been rotated a quarter turn, enabling the locking plunger 243 to engage the feed block 226.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth, and hereinafter claimed.

What we claim as new, and desire to secure by Letters Patent, is:

1. In an embossing machine, a series of members differentially settable in one of a plurality of stamping positions, pairs of complementary stamping dies mounted in each member in opposed spaced relation; means for consecutively setting said members under control of separate preselected fields of a record card, a reciprocable stamping hammer, a frame disposed between the opposed dies of said pairs of dies for supporting plates in stamping positions relative to said members and said hammer, and means for shifting said frame to a separate stamping position for each of said separate card fields controlling the setting of said members.

2. In an embossing machine, the combination of a series of differentially settable members, pairs of complementary oppositely spaced stamping dies mounted in each of said members, record card feeding and sensing means, means for setting said members under control of different preselected fields of a record card successively sensed by said sensing means, a stamping hammer, a frame disposed between opposed dies of said pairs of dies for supporting plates in stamping positions relatives to said members and said hammer, means for feeding plates to said frame, and means for shifting said frame to a separate stamping position for each separate preselected card field controlling the setting of said members.

3. In a card controlled embossing machine, the combination of a reciprocable stamping hammer, record sensing means, a slide differentially settable under control of said sensing means, pairs of oppositely spaced complementary stamping dies supported in said slide, a frame disposed between opposed dies of said pairs of dies for supporting a plate in stamping positions relative to said hammer and said slide, a frame positioning member actuable upon each setting of said slide, and means responsive to the actuation of said member for shifting said frame from one to another stamping position.

4. In a card controlled embossing machine, the combination of a reciprocable stamping hammer, record sensing means, a die supporting slide differentially settable under control of said sensing means, a frame for supporting a plate in stamping position relative to said hammer and said slide, a reciprocating block for feeding a plate to said frame, a frame positioning member actuable upon each setting of said slide, means responsive to the actuation of said member for shifting said frame from one stamping position to another, and feed disabling means responsive to the actuation of said member for preventing reciprocation of said block in all but one position of said frame.

5. In a machine of the class described operating continuously through a succession of cycles, the combination of a plurality of continuously reciprocating sensing pins, means for feeding record cards to a sensing position relative to said pins, a plurality of set pins actuable by said sensing pins, locking slides engageable with said set pins for retaining the card pattern sensed by said sensing pins, a member actuated on each reciprocation of said sensing pins, means responsive to the actuation of said member for retaining a card in sensing position during a second reciprocation of said sensing pins, means responsive to the actuation of said member for rendering said card feed means ineffective to feed a card into position for sensing during said second reciprocation of said sensing pins, means responsive to the actuation of said member for alternately disabling the locking slides engageable with one or another preselected fields of said set pins, a series of die supporting slides differentially settable under control of either of said preselected fields of said set pins, and a frame shiftable on each successive setting of said slides for supporting an embossable plate in stamping positions relative to the dies supported in stamping position by said slides.

6. In a machine of the class described operating continuously through a succession of cycles, the combination of a plurality of continuously reciprocating sensing pins, means for feeding record cards to a sensing position relative to said pins, a plurality of set pins actuable by said sensing pins, locking slides engageable with said set pins for retaining the card pattern sensed by said sensing pins, a member actuated on each reciprocation of said sensing pins, means responsive to the actuation of said member for retaining a card in sensing position during a second reciprocation of said sensing pins, means responsive to the actuation of said member for rendering said card feed means ineffective to feed a card into position for sensing during said second reciprocation of said sensing pins, means responsive to the actuation of said member for alternately disabling the locking slides engageable with one or another preselected fields of said set pins, a series of die supporting slides differentially settable under control of either of said preselected fields of said set pins, a frame for supporting an embossable plate in a plurality of stamping positions, and means for shifting said frame from one to another stamping position corresponding to the preselected field of said set pins controlling the setting of said slides.

7. In a machine of the class described operating continuously through a succession of cycles, the combination of a plurality of continuously reciprocating sensing pins, means for feeding record cards to a sensing position relative to said pins, a plurality of set pins actuable by said sensing pins, locking slides engageable with said set pins for retaining the card pattern sensed by said sensing pins, a member actuated on each reciprocation of said sensing pins, means responsive to the actuation of said member for retaining a card in sensing position during a second reciprocation of said sensing pins, means responsive to the actuation of said member for rendering said card feed means ineffective to feed a card into position for sensing during said second reciprocation of said sensing pins, means responsive to the actuation of said member for alternately disabling the locking slides engageable with one or another preselected fields of said set pins, a series of die supporting slides differentially settable under control of either of said preselected fields of said set pins, a frame for supporting an embossable plate in stamping positions relative to the dies set in stamping position by said slides, a frame positioning member actuated upon each setting of said slides, means responsive to the actuation of said positioning member for shifting said frame from one to another stamping position upon each setting of said slides, a reciprocable block for feeding said plates to said frame in one stamping position of said frame, and plate feed disabling means responsive to the actuation of said part for preventing reciprocation of said block in other positions of said frame.

8. In an embossing machine, the combination of means for feeding and sensing record cards, a plurality of pairs of complementary stamping dies mounted in rows each pair individually settable in stamping position under control of said sensing means each die of a pair being normally supported in opposed spaced relation to the other die of the pair, means for feeding an embossable plate to a stamping position between the complementary dies of each set pair of dies, operating means engageable with one of each pair of set dies for forcing said die into cooperative stamping relation to the other die of said pair, and means responsive to the setting of said dies in stamping position for rendering said operating means effective.

9. In an embossing machine, the combination of a series of reciprocable members each differentially settable in one of a plurality of stamping positions, pairs of complementary stamping dies mounted in each of said members one for each of said plurality of positions one of each pair being movable into effective stamping relation to the other, positively driven means engageable with said movable die for supplying stamping pressure to each pair of dies set in stamping position, record card feeding and sensing means, selectively actuable stop means responsive to the operation of said sensing means for differentially limiting the movement of said members in positions corresponding to the card patterns sensed by said sensing means, and means responsive to the setting of said members in a stamping position for rendering said positively driven means effective.

10. In an embossing machine, the combination of a series of reciprocal members each differentially settable in one of a plurality of stamping positions, pairs of complementary stamping dies mounted in each of said members one for each of said stamping positions, the dies of each pair being supported in opposed spaced relation one of said dies of each pair being movable into effective stamping relation to the other, means for feeding embossable blanks to a position between the complementary opposed dies of each pair of dies set in a stamping position by said members, positively driven means engageable with said movable die for supplying stamping pressure to each pair of dies set in stamping position, record card feeding and sensing means, selectively actuable stop means for differentially limiting the movement of said members under control of said sensing means, and means responsive to the setting of said members in stamping position for rendering said positively driven means effective.

11. In an embossing machine, the combination of a series of reciprocal members differentially settable in one of a plurality of stamping positions, pairs of complementary stamping dies mounted in each of said members one for each of said plurality of positions, means engageable with one of each pair of said dies when in stamping position for forcing said die into cooperative stamping relation to the other die of said pair, record card feeding means, means for sensing a card in a plurality of consecutive individual sensing operations, selectively actuable stop means responsive to the sensing of different preselected card fields in each individual sensing operation for limiting said members in stamping positions determined by the pattern of said preselected field, and means responsive to the setting of said members in stamping position for rendering said operating means effective.

12. In an embossing machine, the combination of a series of members differentially settable in one of a plurality of stamping positions, pairs of complementary stamping dies mounted in each of said members one for each of said stamping positions one of each pair being movable into cooperative stamping relation to the other, operating means for applying stamping force to said movable one of said dies, record card feeding and sensing means, means for retaining the record card in position for consecutive sensing by said sensing means, selectively actuable stop means responsive to the sensing of a different preselected card field upon each individual sensing of a card for engaging said members in a stamping position determined by the pattern of said preselected card field, and means responsive to the setting of said members in a stamping position for rendering said operating means effective.

13. In an embossing machine, the combination of a series of members differentially settable in one of a plurality of stamping positions, pairs of cooperatively actuable stamping dies mounted in said members one pair for each of said stamping positions, operating means for applying stamping force to each of said pairs when set in a stamping position, record card feeding means, means for sensing a record card in a plurality of consecutive sensing operations, registering means actuable by said sensing means for retaining the card pattern sensed by said sensing means, disabling means for consecutively rendering different preselected fields of said registering means ineffective upon consecutive sensings of a record card, stop means selectively actuable by each of said preselected fields of said registering means for engaging said differentially settable members in positions determined by the pattern registered in the enabled fields of said registering means, and means responsive to each setting of said members in stamping position for rendering said operating means effective.

14. In an embossing machine, the combination of a series of members differentially settable in one of a plurality of stamping positions, pairs of cooperatively actuable stamping dies mounted in said members one pair for each of said stamping positions, operating means for applying stamping force to each of said pairs when set in a stamping position, record card feeding and sensing means, means for retaining a card at position for consecutive sensings by said sensing means, means rendering said feeding means ineffective pending said consecutive sensings, registering means actuable by said sensing means for retaining the card pattern sensed by said sensing means, means for consecutively disabling different preselected fields of said registering means upon each consecutive sensing of card, stops selectively actuable by each of said preselected fields of registering means for engaging said differentially settable members in stamping position in accordance with the pattern retained in that field of said registering means not so disabled, and means responsive of each setting of said members for rendering said operating means effective.

15. In an embossing machine, the combination of a series of members differentially settable in one of a plurality of stamping positions, pairs of cooperatively actuable stamping dies mounted in said members one pair for each of said stamping positions, operating means for applying stamping force to each of said pairs when set in stamping position, record card feeding and sensing means, stops for each of said members, a plurality of set pins for registering the card pattern detected by said sensing means, means for actuating said stops in accordance with a pattern registered in any one of a plurality of preselected fields of said set pins, a member actuated each sensing operation, means responsive to the actuation of said member for retaining a card in position for successive sensing thereof, means responsive to the actuation of said member for controlling said feeding means, means responsive to the actuation of said member for consecutively disabling different preselected fields of said set pins during successive sensings of a record card, and means responsive to the setting of said differentially settable members in stamping position for rendering said operative means effective.

16. In an embossing machine, a differentially settable member comprising a pair of fixedly spaced stamping bars, pairs of complementary stamping dies mounted in said member in opposed relation one of each pair of said dies being supported by a corresponding one of said bars, pressure applying means engageable with a selected pair of said dies for forcing one die of said pair into cooperative stamping relation with the other die of said pair, record sensing means, means for differentially setting said member in stamping position under control of said sensing means, and means responsive to the setting of said member for rendering said pressure applying means effective.

17. In an embossing machine, a series of differentially settable members each comprised of a pair of fixedly spaced stamping bars, pairs of complementary stamping dies mounted in each of said members in opposed relation one die of each pair being supported in a corresponding one of said bars, a frame for supporting an embossable plate in stamping position between the paired bars of each of said members, pressure applying means for forcing one die of a pair into cooperative stamping relation to the other die of said pair, record sensing means, means for differentially setting said members in stamping positions under control of said sensing means, and means operative within each setting of said members for rendering said pressure applying means effective.

18. In an embossing machine, a series of differentially settable members each comprising a pair of fixedly spaced stamping bars, pairs of complementary stamping dies mounted in said bars in opposed relation one of each pair of said dies being supported in one of said bars the other of each pair of dies being supported in the other bar of a pair of bars, means for feeding an embossable plate to a stamping position between the paired bars of each of said members, a stamping hammer operable for forcing a die mounted in one of said bars into cooperative stamping relation with the complementary die mounted in the other of said bars, record sensing means, means under control of said sensing means for differentially setting said members in one of a plurality of stamping positions relative to said hammer, and means responsive to the setting of said members in stamping position for rendering said hammer effective.

19. In an embossing machine, a series of differentially settable members each comprising a pair of fixedly spaced stamping bars, pairs of complementary stamping dies mounted in said members one of each pair of said dies being supported in a related one of said bars, a frame for supporting an embossable plate in stamping position between the paired bars of each of said members, means for feeding said plates into said frame, a reciprocable stamping hammer for applying stamping force to selected pairs of said dies, record sensing means, means under control of said sensing means for differentially setting said members in stamping position relative to said hammer, and means responsive to the differential setting of said members for rendering said hammer effective.

ARTHUR PENTECOST.
ALBERT E. SCHNIERTSHAUER.

(References on following page)

REFERENCES CITED

The following references are of record in the file of this patent:

UNITED STATES PATENTS

| Number | Name | Date |
|---|---|---|
| 1,360,379 | Dyer | Nov. 30, 1920 |
| 1,780,621 | Lasker | Nov. 4, 1930 |
| 1,789,831 | Pannier | Jan. 20, 1931 |
| 1,820,760 | Pannier | Aug. 25, 1931 |
| 2,027,916 | Lasker | Jan. 14, 1936 |
| 2,044,119 | Lasker | June 16, 1936 |
| 2,044,121 | Lasker | June 16, 1936 |
| 2,151,406 | Lasker | Mar. 21, 1939 |